United States Patent
Schmidt et al.

(10) Patent No.: US 7,038,622 B2
(45) Date of Patent: May 2, 2006

(54) SLOT ANTENNA ARRAY USING LTCC TECHNOLOGY

(75) Inventors: Ewald Schmidt, Ludwigsburg (DE); Klaus Voitlaender, Wangen (DE); Stefan Gaier, Stuttgart (DE); Juergen Seidel, Pluederhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/502,410

(22) PCT Filed: Nov. 18, 2003

(86) PCT No.: PCT/DE03/03817

§ 371 (c)(1),
(2), (4) Date: Jul. 23, 2004

(87) PCT Pub. No.: WO2004/079860

PCT Pub. Date: Sep. 16, 2004

(65) Prior Publication Data

US 2005/0073460 A1   Apr. 7, 2005

(30) Foreign Application Priority Data

Mar. 3, 2003   (DE) ................. 103 09 075

(51) Int. Cl.
*H01Q 1/38* (2006.01)

(52) U.S. Cl. ................. 343/700 MS; 343/770

(58) Field of Classification Search ......... 343/700 MS, 343/770
See application file for complete search history.

(56) References Cited

U.S. PATENT DOCUMENTS

| 3,653,052 | A | 3/1972 | Campbell |
| 6,492,949 | B1 * | 12/2002 | Breglia et al. ....... 343/700 MS |
| 6,509,880 | B1 * | 1/2003 | Sabet et al. ............ 343/770 |
| 6,600,103 | B1 | 7/2003 | Schmidt et al. |
| 6,809,688 | B1 * | 10/2004 | Yamada .............. 343/700 MS |
| 6,842,140 | B1 * | 1/2005 | Killen et al. ........ 343/700 MS |

FOREIGN PATENT DOCUMENTS

| DE | 199 04 303 A1 | 8/2000 |
| EP | 0 685 930 A1 | 12/1995 |
| WO | 02/103846 A | 12/2002 |

\* cited by examiner

*Primary Examiner*—Binh V. Ho
(74) *Attorney, Agent, or Firm*—Michael J. Striker

(57) ABSTRACT

In order to produce a planar antenna array in a radar sensor with a multitude of microstrip feeder lines and a multitude of coupling slots for emitting microwave energy into open space, which achieves a favorable antenna efficiency when embodied in a planar design using LTCC technology, the invention proposes embodying the feeder lines and the coupling slots in a multilayer ceramic substrate produced by means of the LTCC thick layer technique with an upper and a lower grounded layer, as well as enclosing the feeder lines and the coupling slots with plated-through contacts from the upper grounded layer to the lower one.

10 Claims, 2 Drawing Sheets

SLOT ANTENNA ARRAY USING LTCC TECHNOLOGY

This application is a 371 of PCT/DE03/03817 Nov. 18, 2003.

BACKGROUND OF THE INVENTION

The invention relates to a planar antenna array in a radar sensor for detecting objects in the vicinity of a motor vehicle, with a multitude of microstrip feeder lines and a multitude of coupling slots for emitting microwave energy into open space.

The patent application EP 0685 930 A1 has already disclosed a radar sensor with a mount that is attached to a vehicle in order, for example, to determine the distance and relative speed of a vehicle driving forward. The radar sensor described therein contains an oscillator, a mixer, an amplifier, an antenna array for sending and receiving microwave radiation, and a receiver with evaluation electronics. An advantageous housing for a radar sensor of this kind has been disclosed, for example, by the patent application DE 199 04 303 A1.

SUMMARY OF THE INVENTION

The object of the invention is to disclose an antenna array of the type mentioned at the beginning, which can be produced using LTCC technology (Low Temperature Cofired Ceramics) and achieves a favorable antenna efficiency in a planar design. This object is attained by the planar antenna array which is designed in accordance with the present invention.

The invention is based on the observation that it is not possible to provide holes and or cavities when the antenna array is produced using the LTCC thick layer technique. Also, the high permittivity impedes a release of waves toward open space. Instead, the microwave energy strays in the ceramic.

According to the invention, the feeder lines and the coupling slots are embodied in a multilayer ceramic substrate produced by means of the LTCC thick layer technique with an upper and a lower grounded layer, and the feeder lines and coupling slots are enclosed by plated-through contacts from the upper to the lower grounded layer. This assures that the microwave energy cannot be radiated into the rest of the circuit.

It is advantageously possible for the feeder lines and the coupling slots to be surrounded at a fixed distance by plated-through contacts, the distance being smaller than a critical distance at which waveguide modes form. This shielding makes it possible to nail down, so to speak, the lines for the radiation.

It is preferable if the fixed distance lies in the range from approx. $0.01*\lambda$ to approx. $0.1*\lambda$, where $\lambda$ is the wavelength of the microwave radiation emitted.

According to the advantageous modification, each coupling slot is enclosed by a single-row arrangement of plated-through contacts.

Alternatively, each coupling slot can be enclosed by a double-row arrangement of plated-through contacts. The two rows can be aligned with each other or offset from each other. Naturally, other forms such as triple-row, quadruple-row, or n-row arrays are also possible, but require a greater area.

The distance of the coupling slots from the end of the resonator is essentially $(2n-1)*\lambda/4$, where $\lambda$ is the wavelength of the emitted microwave radiation and n is a natural number. In the simplest case, the distance of the coupling slots from the end of the resonator is approximately $\lambda/4$, with n=1.

The distance of the coupling slots from the back wall is essentially $2n*\lambda/4$, where $\lambda$ is the wavelength of the microwave radiation emitted and n is a natural number. In the simplest case, the distance of the coupling slots from the back wall is approximately $\lambda/2$, with n=1.

In the advantageous embodiment, the plated-through contacts enclose the coupling slots along an essentially rectangular perimeter line. The distance of the coupling slots from the edge or the plated-through contacts perpendicular to the slot direction is preferably essentially $2n*\lambda/4$, where $\lambda$ is the wavelength of the microwave radiation emitted and n is a natural number. Here, too, in the simplest case, the distance is approximately $\lambda/2$, with n=1.

A particularly high transmission of energy to the entire slot is achieved by means of the feature of claim 9 according to which the plated-through contacts enclose the coupling slots along a perimeter line that bulges in the middle of the slots. The distance is somewhat greater than $2n*\lambda/4$ in the middle of the slots and is somewhat less than $2n*\lambda/4$ outside the middle. Here, too, $\lambda$ is the wavelength of the microwave radiation emitted and n is a natural number.

In order to reflect the laterally straying energy back to the coupling slots, the plated-through contacts enclose the coupling slots along a perimeter line with rounded corners.

In order to increase the inhibiting action, two rows of plated-through contacts are spaced apart from each other by the distance of half a wavelength.

On the whole, the embodiment forms according to the invention offer a completely planar design of the antenna array without the requirement of holes or cavities, a simple and inexpensive production using LTCC technology, a complete shielding of other circuit parts, and the recovery of stray fields. This increases the power emitted and consequently also the efficiency of the antennae.

BRIEF DESCRIPTION OF THE DRAWINGS

Exemplary embodiments of the invention will be explained in detail below in conjunction with the drawings.

DESCRIPTION OF THE PREFERRED EMBODIMENTS

Figure 1:
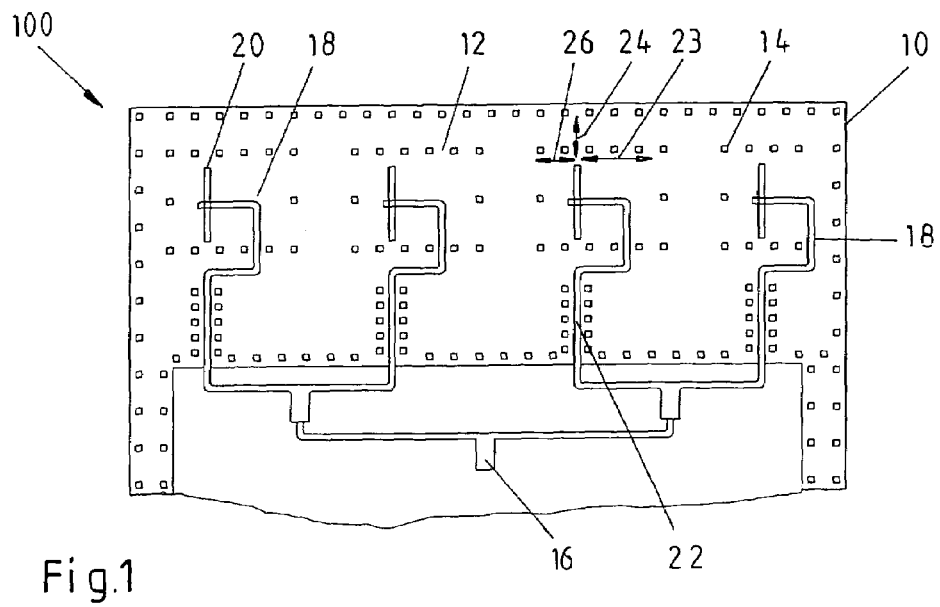
FIG. 1 shows a view of a planar antenna array according to an exemplary embodiment of the invention.

FIG. 1 shows a view of a planar antenna array 100 according to an exemplary embodiment of the invention. The antenna array 100 has an LTCC substrate 10 with an upper grounded layer 12 and a lower grounded layer that is not visible in the depiction in FIG. 1. A number of rectangular plated-through contacts 14 connect the upper grounded layer to the lower grounded layer.

The antenna array 100 also has a microstrip feeder network 16, which in the exemplary embodiment, supplies four embedded feeder lines 18 that each lead to one of four coupling slots 20 for emitting microwave radiation into open space. Between the feeder lines 18 and the feeder network 16, the LTCC substrate 10 has four coplanar waveguides 22. In the exemplary embodiment of FIG. 1, the plated-through contacts 14 enclose the coupling slots 20 with a distance 24 of approximately $\lambda/2$ in the slot direction and with distances 26 and 28 of approximately $0.8*\lambda/2$ and $1.3*\lambda/2$ perpendicular to the slot direction.

Figure 2:
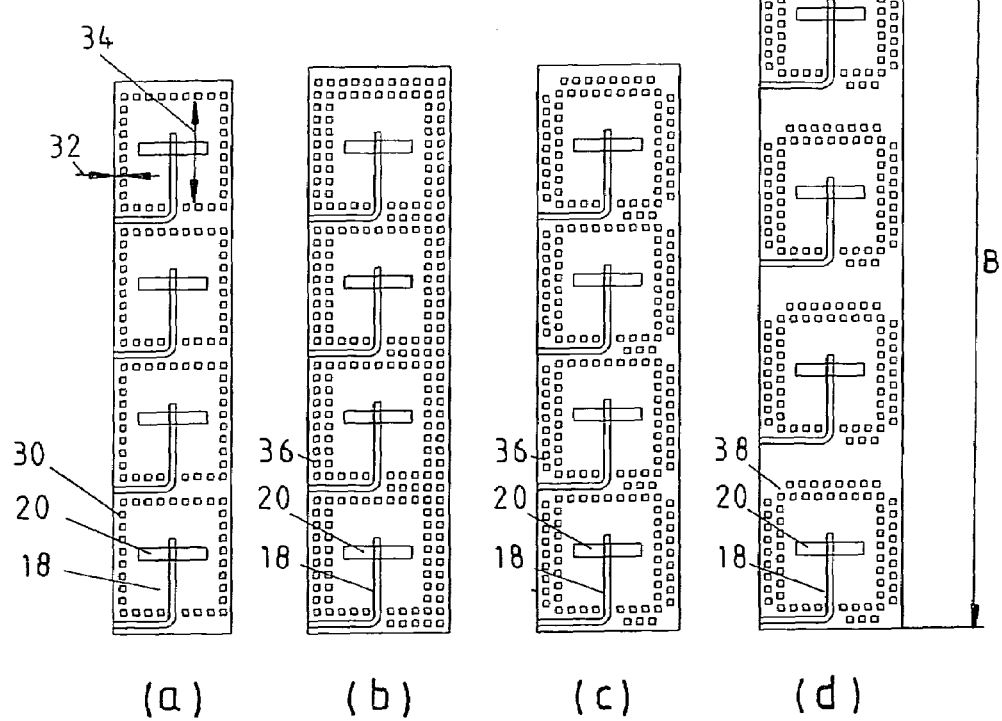
FIG. 2 in (a) to (d) shows versions of the shielding of the coupling slots for an antenna array with four elements.

FIG. 2 shows different versions of the shielding by means of the plated-through contacts for an antenna array with four elements. FIG. 2(a) shows the coupling slots 20 enclosed by a single-row arrangement of plated-through contacts 30 in the form of a rectangle. The distance 32 between the coupling slots 20 and the plated-through contacts in the slot direction is approximately $0.1*\lambda/2$. The distance 34 between the upper and lower rows of plated-through contacts is approximately one wavelength.

FIG. 2(b) shows an alternative embodiment in which the coupling slots 20 are enclosed at distances unchanged from FIG. 2(a) by double-rowed arrangements of plated-through contacts 36. The two rows of plated-through contacts are aligned in relation to each other, i.e., a parallel line in the slot direction will either intersect both of the plated-through contacts or will intersect neither of them. A likewise possible arrangement of the rows of plated-through contacts 38 offset from each other is shown in FIGS. 2(c) and 2(d). Whereas the embodiment in FIG. 2(c) is optimized for the most compact dimensions, the four array elements in FIG. 2(d) are distributed over the same connection width B.

Figure 3:
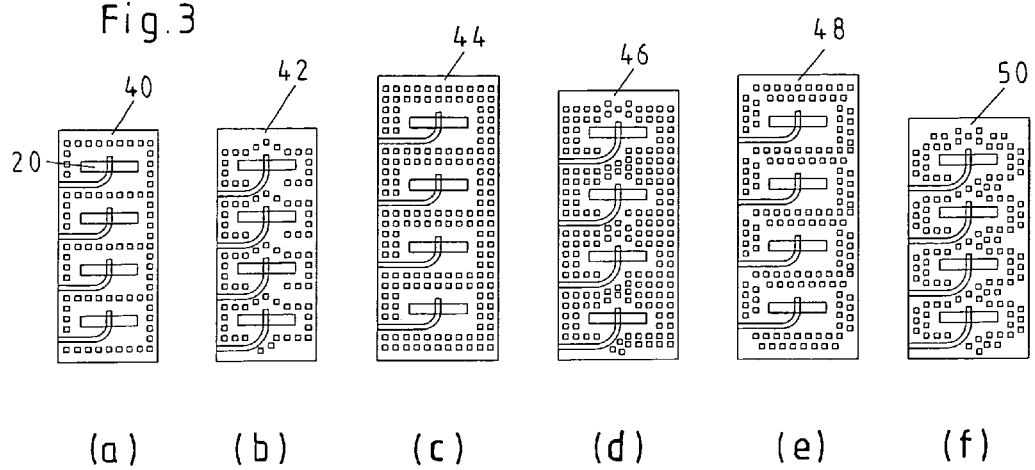
FIG. 3 in (a) to (f) shows advantageous arrangement versions for the plated-through contacts with particularly compact dimensions.
Figure 4:
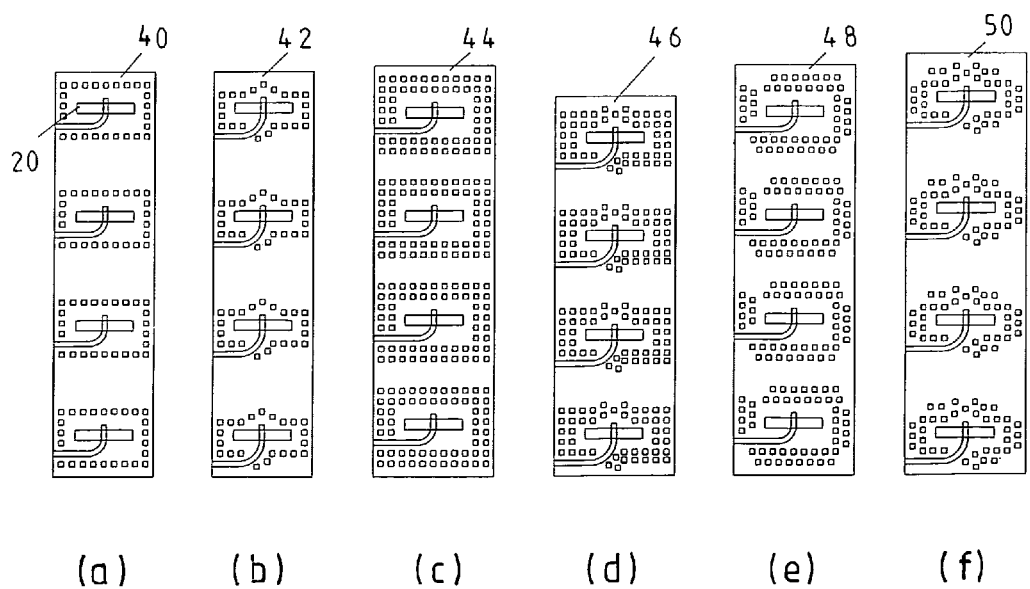
FIG. 4 in (a) to (f) shows advantageous arrangement versions for the plated-through contacts with particularly high gain.

Other advantageous arrangement versions for the plated-through contacts are shown in FIGS. 3 and 4. The structures in FIG. 3 were each designed for the most compact dimensions, while the structures in FIG. 4 are optimized for maximal gain.

Similar to FIG. 2(a), FIGS. 3(a) and 4(a) each show an array in which the coupling slots 20 are enclosed by a single-row arrangement of plated-through contacts 40 in the form of a rectangle. The distance here of the coupling slots 20 to the edge of the plated-through contacts 40 is approximately $\lambda/2$ perpendicular to the slot direction.

In the versions in FIGS. 3(b) and 4(b), the coupling slots 20 are enclosed by the plated-through contacts 42 along a perimeter line that bulges at the middle of the slot. The distance of the coupling slots 20 from the edge of the plated-through contacts 42 is somewhat greater than $\lambda/2$ in the middle of the slots and is somewhat less than $\lambda/2$ outside the middle of the slots. This produces a very favorable bundling of the energy into the entire coupling slot 20.

The structures in FIGS. 3(c) and 4(c) and FIGS. 3(d) and 4(d) are analogous to the structures in FIGS. 3(a) and 4(a) and FIGS. 3(b) and 4(b), the single-row arrangement being replaced with a double-row arrangement of plated-through contacts 44 and 46.

The versions according to FIGS. 3(e) and 4(e) incorporate the energy present in the outer corners. The rounded corners of the perimeter line of the plated-through contact arrangements 48 reflect the laterally straying energy back to the coupling slot 20 so that it can be used.

The plated-through contact arrangements 50 of the structures according to FIGS. 3(f) and 4(f) combine the advantages of the perimeter line that bulges in the middle according to FIGS. 3(d) and 4(d) with the rounded corner arrangement of FIGS. 3(e) and 4(e), and yield a particularly favorable efficiency of the antennae.

Whereas the invention has been depicted and described particularly in reference to a preferred exemplary embodiment, it is evident to one skilled in the art that changes can be made in the design and details without going beyond the concepts and scope of the invention. Correspondingly, the disclosure of the current invention should not be viewed as limiting. Instead, the disclosure of the current invention is solely intended to illustrate the scope of the invention as demonstrated in the following claims.

The invention claimed is:

1. A planar antenna array in a radar sensor for detecting objects in the vicinity of a motor vehicle, with a multitude of microstrip feeder lines and a multitude of coupling slots for emittimg microwave energy into open space, characterized in that
   the feeder lines and the coupling slots are embodied in a multilayer ceramic substrate produced by means of the Low Temperature Co-fired Ceramic thick layer technique with an upper and a lower grounded layer,
   the feeder lines and coupling slots are enclosed by plated-through contacts from the upper grounded layer to the lower one, and
   the feeder lines and coupling slots are surrounded at a fixed distance by plated-through contacts, the distance being smaller than a critical distance at which waveguide modes form.

2. The antenna array according to claim 1, wherein the fixed distance lies in the range from approx. $0.01*\lambda$ to approx. $0.1*\lambda$, where $\lambda$ is the wavelength of the microwave radiation emitted.

3. The antenna array according to claim 1, wherein each coupling slot is enclosed by a single-row arrangement of plated-through contacts.

4. The antenna array according to claim 1, wherein each coupling slot is enclosed by a double-row arrangement of plated-through contacts, wherein the two rows are aligned with each other or offset from each other.

5. The antenna array according to claim 1, wherein the distance of the coupling slots from the end of the resonator is essentially $(2n-1)*\lambda/4$, where $\lambda$ is the wavelength of the emitted microwave radiation and n is a natural number.

6. The antenna array according to claim 1, wherein the distance of the coupling slots from the back wall is essentially $2n*\lambda/4$, where $\lambda$ is the wavelength of the microwave radiation emitted and n is a natural number.

7. The antenna array according to claim 1, wherein the plated-through contacts enclose the coupling slots along an essentially rectangular perimeter line, wherein the distance of the coupling slots from the edge of the plated-through contacts is preferably essentially $2n*\lambda/4$ perpendicular to the slot direction, where $\lambda$ is the wavelength of the microwave radiation emitted and n is a natural number.

8. The antenna array according to claim 1, wherein the plated-through contacts enclose the coupling slots along a perimeter line that bulges in the middle of the slots, wherein the distance is greater than $2n*\lambda/4$ in the middle of the slots and is less than $2n*\lambda/4$ outside the middle, where $\lambda$ is the wavelength of the microwave radiation emitted and n is a natural number.

9. The antenna array according to claim 1, wherein the plated-through contacts enclose the coupling slots along a perimeter line with rounded corners.

10. The antenna array according to claim 1, wherein two rows of plated-through contacts are provided spaced apart from each other by the distance of half a wavelength.

* * * * *